United States Patent
Kotra et al.

(10) Patent No.: US 12,189,953 B2
(45) Date of Patent: Jan. 7, 2025

(54) SPECULATIVE DRAM REQUEST ENABLING AND DISABLING

(71) Applicant: Advanced Micro Devices, Inc., Santa Clara, CA (US)

(72) Inventors: Jagadish B. Kotra, Austin, TX (US); John Kalamatianos, Boxborough, MA (US)

(73) Assignee: Advanced Micro Devices, Inc.

( * ) Notice: Subject to any disclaimer, the term of this patent is extended or adjusted under 35 U.S.C. 154(b) by 0 days.

(21) Appl. No.: 17/956,417

(22) Filed: Sep. 29, 2022

(65) Prior Publication Data

US 2024/0111420 A1  Apr. 4, 2024

(51) Int. Cl.
*G06F 12/00* (2006.01)
*G06F 3/06* (2006.01)

(52) U.S. Cl.
CPC .......... *G06F 3/0611* (2013.01); *G06F 3/0653* (2013.01); *G06F 3/0673* (2013.01)

(58) Field of Classification Search
CPC ..... G06F 3/0611; G06F 3/0653; G06F 3/0673
USPC ........................................................ 711/154
See application file for complete search history.

(56) References Cited

U.S. PATENT DOCUMENTS

| | | |
|---|---|---|
| 6,421,762 B1 | 7/2002 | Arimilli et al. |
| 2012/0284463 A1 | 11/2012 | Srinivasan et al. |
| 2018/0150406 A1 | 5/2018 | John et al. |
| 2019/0065384 A1 | 2/2019 | Al Sheikh et al. |
| 2019/0294546 A1 | 9/2019 | Agarwal et al. |
| 2020/0285580 A1* | 9/2020 | Subramanian ...... G06F 13/1668 |
| 2023/0205700 A1* | 6/2023 | Nakra ................... G06F 12/084 |
| | | 711/137 |

FOREIGN PATENT DOCUMENTS

TW  548545 B  *  8/2023

OTHER PUBLICATIONS

TW548545B; Aug. 21, 2003.*
Somogyi, S., et. at., "Spatial Memory Streaming", Proceedings of the 33rd Annual International Symposium on Computer Architecture, Jun. 2006, 12 pgs.
Somogyi, S., et. al., "Spatio-Temporal Memory Streaming", Proceedings of the 36th International Symposium on Computer Architecture, Jun. 2009, 12 pgs.
Jevdjic, D., et. al., "Die-Stacked DRAM Caches for Servers: Hit Ratio, Latency, or Bandwidth? Have It All with Footprint Cache", Proceedings of the 40th International Symposium on Computer Architecture, Jun. 2013, 12 pgs.
Bera, R., et. al., "DSPatch: Dual Spatial Pattern Prefetcher", MICRO-52, ACM, Oct. 2019, 14 pgs.

(Continued)

*Primary Examiner* — Mardochee Chery
(74) *Attorney, Agent, or Firm* — Volpe Koenig

(57) ABSTRACT

Methods, devices, and systems for retrieving information based on cache miss prediction. It is predicted, based on a history of cache misses at a private cache, that a cache lookup for the information will miss a shared victim cache. A speculative memory request is enabled based on the prediction that the cache lookup for the information will miss the shared victim cache. The information is fetched based on the enabled speculative memory request.

20 Claims, 5 Drawing Sheets

(56) References Cited

OTHER PUBLICATIONS

Bakhshalipour, M., et. al., "Bingo Spatial Data Prefetcher", 2019 IEEE International Symposium on High Performance Computer Architecture, IEEE, 2019, 13 pgs.

Sembrant, A., et. al., "The Direct-to-Data (D2D) Cache: Navigating the Cache: Navigating the Cache Hierarchy with a Single Lookup", 2014 ACM/IIEEE 41st International Symposium on Computer Architecture, IEEE, Jun. 2014, 12 pgs.

Loh, G. H., & Hill, M. D., "Efficiently Enabling Conventional Block Sizes for Very Large Die-stacked DRAM Caches", Micro 11, ACM, Dec. 2011, 11 pgs.

International Search Report and Written Opinion for International Application No. PCT/US2023/030971 dated Dec. 12, 2023, 9 pages long.

\* cited by examiner

SPECULATIVE DRAM REQUEST ENABLING AND DISABLING

BACKGROUND

Computer systems include memory devices which store information for use by a processing device. Computer systems usually include several types of memory with different capabilities, such as processor registers, cache memory, and main memory. The different types of memory are typically organized in a memory hierarchy based on access latency or other suitable metrics. The memory hierarchy may include processor registers, cache memory, and main memory. Other devices, such as hard disk drives and tape backup drives, are also included in the memory hierarchy in some implementations, although such devices are often referred to as storage devices rather than memory devices. Access latency refers to the time between a request for the information from the memory and the access being completed, e.g., by the return of the requested data.

Devices at the top of the memory hierarchy, such as processor registers, have the fastest access time in the system and are the most immediately available for access (e.g., are powered on and/or are organized for more immediate access), but typically have smaller storage capacity and/or are more expensive (e.g., in terms of power consumption and/or die area cost). Devices lower in the memory hierarchy have slower access time and/or are less immediately available for access, but typically have larger storage capacity and/or are less expensive. The processing unit typically only has direct access to devices at the top of the memory hierarchy (e.g., processor registers).

More frequently used information is stored in higher levels of the memory hierarchy, and less frequently used information is stored in lower levels. If information that is required for a computation by the processor is not present in the top of the memory hierarchy, it is retrieved from the next lower level of the hierarchy and stored in the top of the memory hierarchy. For example, if a certain piece of information that is needed for a calculation is not present in a processor register, it is fetched from a cache memory. If the information is also not available in the next lower level of the hierarchy, it is fetched from a further lower level (e.g., a lower level cache, or system memory). The time used to determine whether information is available in a particular level of the memory hierarchy and to retrieve it from a lower level of the memory hierarchy impacts the performance of the computer system, contributing to access latency.

BRIEF DESCRIPTION OF THE DRAWINGS

A more detailed understanding can be had from the following description, given by way of example in conjunction with the accompanying drawings wherein.

DETAILED DESCRIPTION

Figure 1:
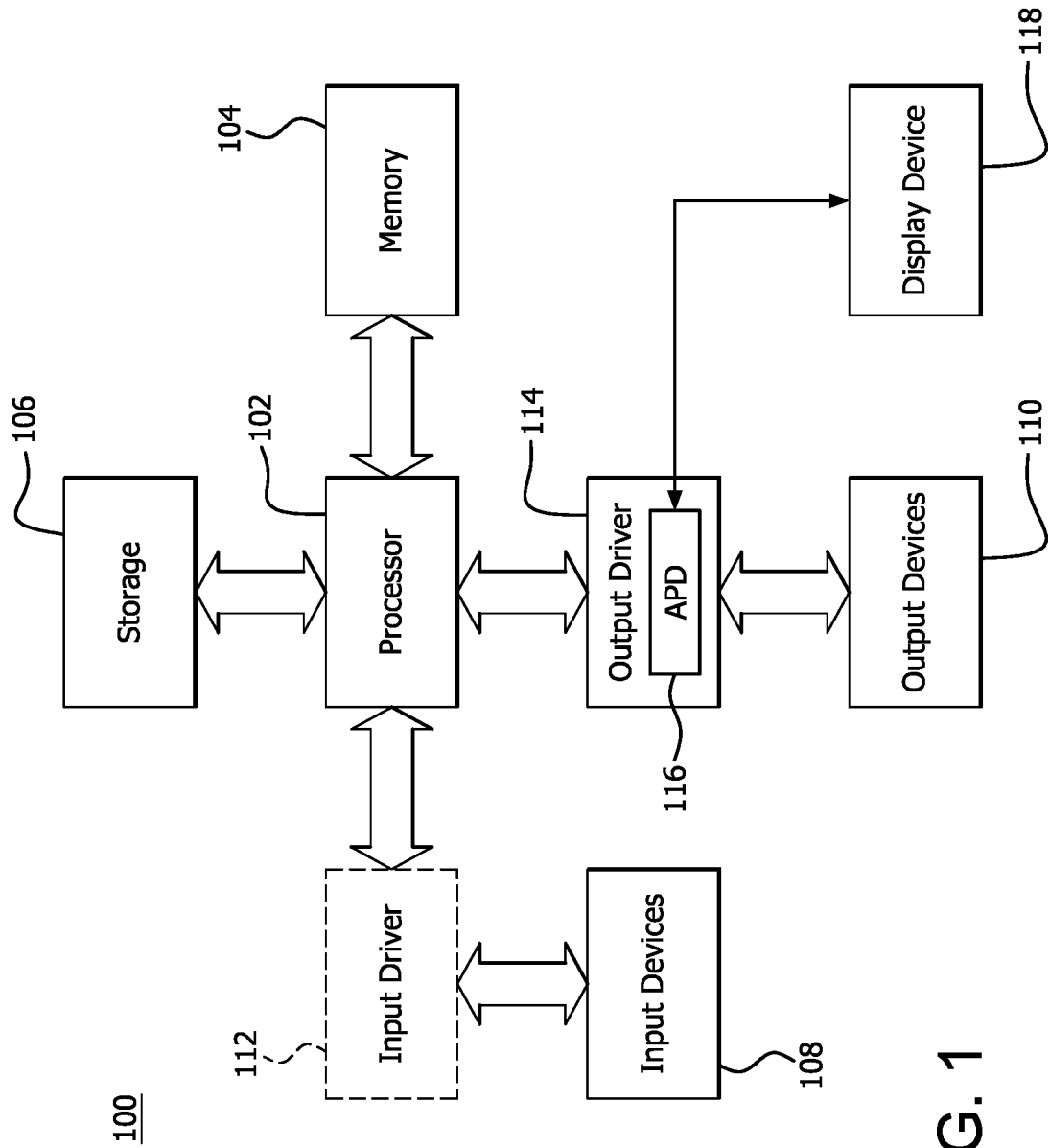
FIG. 1 is a block diagram of an example device in which one or more features of the disclosure can be implemented.

Some implementations provide a method for retrieving information based on cache miss prediction. It is predicted, based on a history of cache misses at a private cache, that a cache lookup for the information will miss a shared victim cache. A speculative memory request is enabled based on the prediction that the cache lookup for the information will miss the shared victim cache. The information is fetched based on the enabled speculative memory request.

In some implementations, the fetching comprises fetching the information from a main memory and from the shared victim cache based on the enabled speculative memory request. In some implementations, the speculative memory request comprises a speculative DRAM request (SDR). In some implementations, the private cache is an L2 cache and the shared victim cache is an L3 cache. In some implementations, the prediction is based on a spatial bit vector.

Some implementations provide a processor configured for retrieving information based on cache miss prediction. The processor includes circuitry configured to predict, based on a history of cache misses at a private cache, that a cache lookup for the information will miss a shared victim cache. The processor also includes circuitry configured to enable a speculative memory request based on the prediction that the cache lookup for the information will miss the shared victim cache. The processor also includes circuitry configured to fetch the information based on the enabled speculative memory request.

In some implementations, the processor includes circuitry configured to fetch the information from a main memory and from the shared victim cache based on the enabled speculative memory request. In some implementations, the speculative memory request comprises a speculative DRAM request (SDR). In some implementations, the private cache is an L2 cache and the shared victim cache is an L3 cache. Some implementations include circuitry configured to store a spatial bit vector, wherein the prediction is based on the spatial bit vector.

Some implementations provide a method for retrieving information based on cache miss prediction. It is predicted, based on a history of cache misses at a last level cache, that a cache lookup for the information will miss a shared victim cache. A speculative memory request is enabled based on the prediction that the cache lookup for the information will miss the shared victim cache. The information is fetched based on the enabled speculative memory request.

In some implementations, the fetching comprises fetching the information from a main memory and from the shared victim cache based on the enabled speculative memory request. In some implementations, the speculative memory request comprises a speculative DRAM request (SDR). In some implementations, the last level cache is not within a cache coherence domain. In some implementations, the prediction is based on a spatial bit vector.

Some implementations provide a processor configured for retrieving information based on cache miss prediction. The processor includes circuitry configured to predict, based on a history of cache misses at a last level cache, that a cache lookup for the information will miss a shared victim cache.

The processor also includes circuitry configured to enable a speculative memory request based on the prediction that the cache lookup for the information will miss the shared victim cache. The processor also includes circuitry configured to fetch the information based on the enabled speculative memory request.

In some implementations, the processor includes circuitry configured to fetch the information from a main memory and from the shared victim cache based on the enabled speculative memory request. In some implementations, the speculative memory request comprises a speculative DRAM request (SDR). In some implementations, the private cache is an L2 cache and the shared victim cache is an L3 cache. In some implementations, the processor includes circuitry configured to store a spatial bit vector, wherein the prediction is based on the spatial bit vector.

FIG. 1 is a block diagram of an example device 100 in which one or more features of the disclosure can be implemented. The device 100 can include, for example, a computer, a gaming device, a handheld device, a set-top box, a television, a mobile phone, server, a tablet computer or other types of computing devices. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes any suitable processing unit, such as a central processing unit (CPU), a graphics processing unit (GPU), a field programmable gate array (FPGA), application specific integrated circuit (ASIC), a CPU and GPU located on the same die, or one or more processor cores, wherein each processor core can be a CPU or a GPU, and so forth. In various alternatives, the processor 102 includes registers and one or more levels of cache memory. In various alternatives, the processor 102 includes a memory controller and/or other circuitry configured to manage a memory hierarchy, which includes the registers, cache memory, and memory 104. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid-state drive, an optical disk, or a flash drive. In various alternatives, storage 106 is also part of the memory hierarchy. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 116 includes an accelerated processing device ("APD") 116 which is coupled to a display device 118. The APD accepts compute commands and graphics rendering commands from processor 102, processes those compute and graphics rendering commands, and provides pixel output to display device 118 for display. As described in further detail below, the APD 116 includes one or more parallel processing units to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and provides graphical output to a display device 118. For example, it is contemplated that any processing system that performs processing tasks in accordance with a SIMD paradigm may perform the functionality described herein. Alternatively, it is contemplated that computing systems that do not perform processing tasks in accordance with a SIMD paradigm can also perform the functionality described herein.

If a processor, memory controller, or other hardware requests information from a level of the memory hierarchy and the information is available at that level, the request can be referred to as a hit. If the information is not available at that level, the request can be referred to as a miss. Different levels of a cache hierarchy can have any suitable name. In an example naming convention, L1 is the top-level cache, L2 is the next level cache below L1, and L3 is the next level cache below L2. It is noted that any suitable naming convention, including those not used herein, can be used without departing from the invention.

In an example computing system, if a processor executes an instruction to load a certain piece of information into a processor register, the memory system determines whether the information is available at the next level of the memory hierarchy, such as a top-level or L1 cache. In some implementations, the determination is made by a memory controller or other suitable hardware. If the information is not available in the top-level cache, the instruction can be said to miss the top-level cache. In this circumstance, the memory system will typically perform a lookup in the next lower level of the memory hierarchy (e.g., an L2 cache) to determine whether the information is available there. This lookup may also hit or miss, and the process may continue down the memory hierarchy until the information is found and ultimately loaded into the processor register.

As the memory system proceeds to search down the memory hierarchy for the requested information, the lookup at each level typically becomes slower and slower due to the increasing access latency in lower levels of the memory hierarchy, e.g., due to a relatively larger number of cache ways to search (in caches) and/or longer distance to travel to spatially distributed physical storage structures.

For example, in a memory hierarchy which includes three levels of cache (L1, L2, and L3 caches) above a main memory (e.g., DRAM) level, there may be significant differences in access latency between the different levels. In some implementations, the difference in access latency may be due to the significantly larger size of the next lower level cache, the longer distance to the physical memory arrays of the lower level cache, and/or to the main memory, etc.

Because the increase in access latency of the next lower level in the memory hierarchy may be significant, in some cases it is advantageous to begin the lookup of the next lower level before the current level returns a hit or miss. In an example, upon an L2 cache miss, it is typically necessary to perform a relatively slow L3 cache lookup.

Because the L3 (in this example) cache lookup is relatively slower, and because a main memory (DRAM in this example) lookup (e.g., main memory fetch) is slower still, in some implementations, a DRAM lookup is performed in parallel with the L3 cache lookup. In some implementations, the parallel DRAM lookup is begun at the same time as the L3 cache lookup, or begun before the end of the L3 cache lookup.

If the L3 cache lookup misses, the parallel DRAM lookup returns its result sooner than if the memory system had waited for the L3 cache lookup to complete before beginning the DRAM lookup. The parallel DRAM lookup is ignored, terminated, and/or discarded, etc., if the L3 cache lookup hits. This parallel lookup is conceptually possible between other levels of a memory hierarchy, such as performing both L2 and L3 lookups in parallel in response to an L1 cache miss. Further parallelism is also conceptually possible, such as performing parallel L2, L3, and DRAM lookups in response to an L1 cache miss.

The parallel DRAM (or other cache or memory) lookup is performed based on the assumption (or speculation) that it is likely that the L3 cache lookup will miss, e.g., because L3 cache lookups miss more often than not, or more often than a threshold miss rate. Accordingly, such parallel DRAM lookups can be referred to as speculative DRAM requests (SDR). It is noted that parallel lookups are referred to as SDR herein for convenience with the described examples, however the same techniques are also applicable to non-DRAM lookups (e.g., between cache levels, or other types of memory (i.e., non-DRAM)).

In some implementations, launching a parallel lookup of two or more lower levels of the memory hierarchy comes at a cost to communications bandwidth. For example, main memory typically communicates with a processor (and on-chip caches) over a memory bus. The memory bus is a shared electrical connection. In some implementations, the memory bus transfers information between different modules of the main memory and different processors over the same memory bus. Thus, a potentially unnecessary main memory fetch (e.g., DRAM lookup) upon an L2 cache miss can have the effect of reducing the amount of useful memory bus bandwidth available for communications by other processors, DRAM modules, etc. Analogous bandwidth costs would also apply to other memory communications, such as on-chip interconnect between cache memories and processor registers, or between a backing store and multiple computer systems, etc. Thus, in some implementations, whether and which parallel lookups are used at a particular level of the memory hierarchy depend on factors such as a balance of improved access latency, design cost, complexity, and/or available bandwidth.

In some implementations, the SDRs are issued based on the average access latency difference between the cache/memory level and the next cache/memory hierarchy level. For example, in some implementations, if the average access latency of the next level cache/memory hierarchy is much higher than that of the earlier cache level, SDRs are disabled by default as the latency savings by not waiting for the lower-level cache lookup will not bring in significant performance improvements.

In some implementations, miss prediction is used to reduce, minimize, or otherwise manage the memory bandwidth penalty in performing parallel lookups. For example, in some implementations, if it is predicted to be likely (e.g., more likely than a threshold probability) that the L3 will miss on a given L2 miss request, a parallel DRAM lookup is performed, whereas the parallel DRAM lookup is not performed if it is predicted to be likely (e.g., more likely than a threshold probability) that the L3 will not miss on a given L2 miss request.

It is observed that spatial access patterns at the private or core level, such as spatial access patterns of an L2 cache in this example, are the same or similar to access patterns in a shared victim cache, such as the L3 cache in this example, in some cases.

It is also observed that spatial access patterns at the system-on-chip (SoC), chip, or package level (e.g., a memory side cache (MSC), last level cache (LLC), L4 cache, a cache shared by all core complexes, a cache outside the cache coherence domain of the core complexes, a cache attached to the memory, or the like), such as spatial access patterns of an MSC in this example, are the same or similar to access patterns in a shared victim cache, such as the L3 cache in this example, in some cases.

Figure 2:
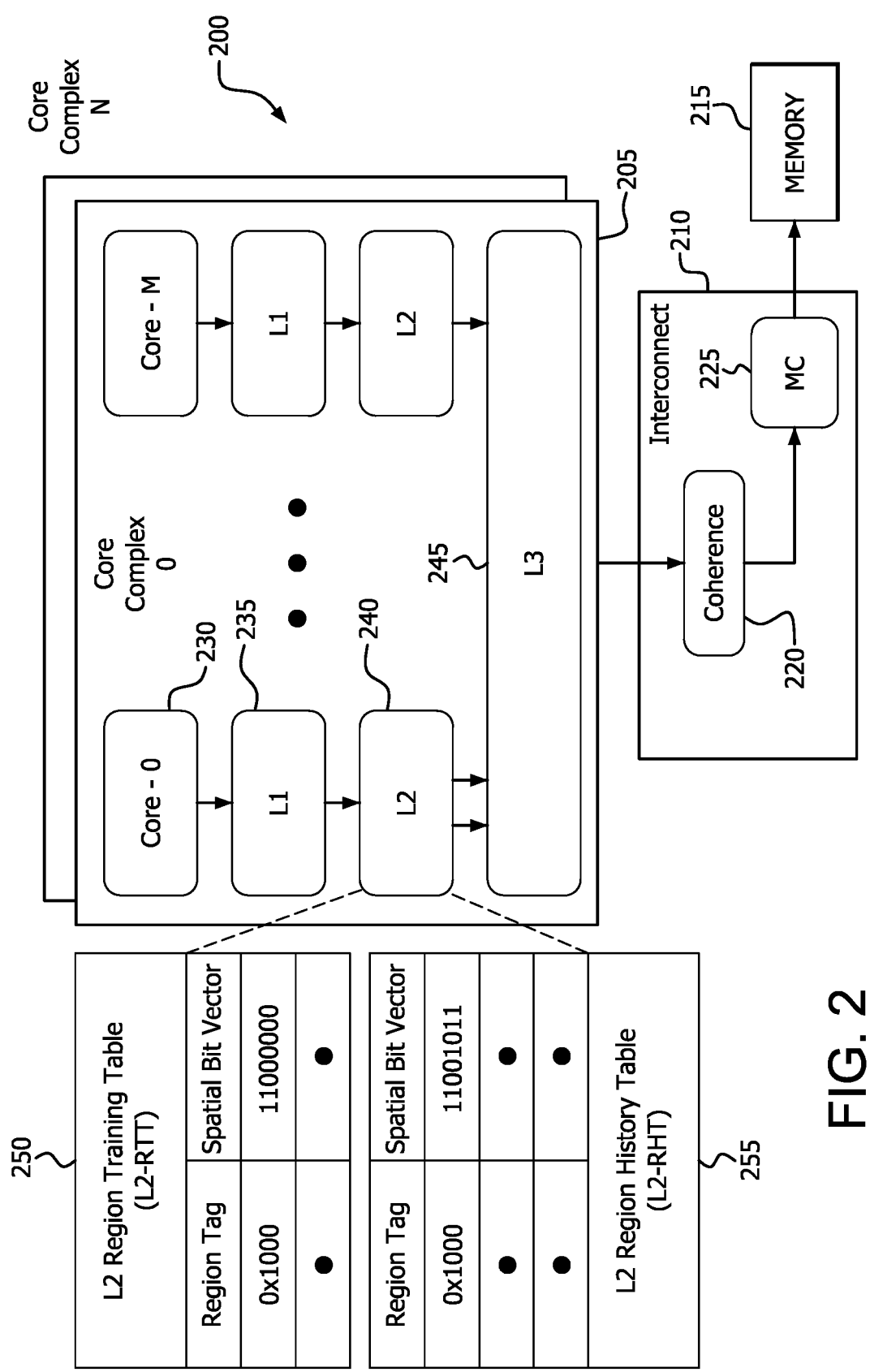
FIG. 2 is a block diagram illustrating portions of an example computing system which leverages correspondence between spatial access patterns of a private cache and shared victim cache.

FIG. 2 is a block diagram illustrating portions of an example computing system 200 which leverages the correspondence between spatial access patterns of a private (L2 in this example) cache and shared victim (L3 in this example) cache. Computing system 200 includes core complexes (N core complexes in this example) including a core complex 205, interconnect 210, and memory 215.

Each of the N core complexes includes a plurality of cores (M cores in this example), a shared cache, and private caches for each core. For example, in core complex 205, core 230 includes or is in communication with an L1 cache 235, an L2 cache 240, and an L3 cache 245. L1 cache 235 is private to core 230 and is the top-level cache in the memory hierarchy of core 230. L2 cache 240 is also private to core 235. L3 cache 245 is shared among all of the cores (Core 0-Core M) of core complex 205 and is a victim cache of L2 cache 240, and of L2 caches of the other cores in core complex 205. It is noted that in some examples, L2 cache 240 is a victim cache, or a non-inclusive cache, with respect to L1 cache 235.

Interconnect 210 includes any suitable hardware and/or software for providing communication between core complexes 205 and memory 215. For example, in some implementations, interconnect 210 includes a memory bus and/or any other suitable communications interface. In this example, interconnect 210 includes coherence manager 220 and memory controller 225. Coherence manager 220 manages coherence among the caches of core complexes 205 and may include any suitable hardware and/or software for this purpose, such as a cache directory and/or probe filter. Memory controller 225 includes any suitable hardware and/or software for managing the flow of data going to and from memory 215.

Memory 215 is a main memory of computing system 200, and may include any suitable memory, such as DRAM.

L2 cache 240 also includes a L2 region training table (L2-RTT) 250, and an L2 region history table (L2-RHT) 255.

In operation, L2-RTT 250 tracks hits and misses of L2 cache lookups, e.g., due to L1 cache misses at L1 cache 235. In some implementations, L2-RTT 250 tracks hits and misses of L2 cache lookups by region. In some implementations, the region is a region of physical memory (e.g., of memory 215). In some implementations, the region is a fixed-size portion of the address space of computing system 200. In some implementations, the region includes multiple consecutive cache blocks. In some implementations, L2-RTT 250 tracks a pattern of accesses to the region. It is noted that L2-RTT 250 is a table in this example, however in some implementations, this information is tracked in any other suitable way, other than a table.

In some implementations, L2-RTT 250 tracks a pattern of missed L2 cache lookups to a particular region using a bit vector associated with the region. This bit vector can be referred to as a spatial bit vector or spatial pattern. In some implementations, the region is identified by a cache tag, which can be referred to as a region tag. In some implementations, the spatial pattern is associated with a particular region by association with a particular region tag. In some implementations, L2-RTT 250 tracks missed L2 cache lookups to a particular region within a particular time interval. The time interval can be referred to as a spatial region generation interval.

In some implementations, the pattern of L2 cache misses for memory addresses corresponding to a particular region during a spatial region generation interval are recorded in a spatial bit vector associated with a region tag corresponding to the particular region. In some implementations, the spatial bit vector represents the set of blocks in the associated region that are accessed during a spatial region generation interval, and the spatial bit vector captures the layout of cache blocks accessed near one another in time (i.e., within the spatial region generation interval). In some implementations, the spatial region generation interval is defined in any suitable manner. For example, in some implementations the spatial region generation interval is a pre-defined time duration. In some implementations, the pre-defined time duration is defined in terms of cycles. In some implementations, a spatial region generation interval is on the order of several hundred cycles, or several thousand cycles, for example. In some implementations, a region associated with a region tag is considered trained, or fully trained, after the spatial bit vector associated with the region tag has been accumulated over an entire spatial region generation interval.

After a region has been trained, or fully trained, in some implementations, the region tag and associated spatial bit vector are stored in L2-RHT 255. After a spatial bit vector corresponding to a region is available in L2-RHT 255, in some implementations, the spatial bit vector is predictive of whether a missed L2 cache 240 lookup of an address in the region will also miss the L3 cache 245.

This is consistent with the observation that in some implementations spatial access patterns at the private or core level are the same or similar to access patterns in a shared victim cache, the L2-RHT 255, based on training at the L2 cache, is predictive of whether an L3 lookup will hit or miss the L3 cache 245 (or other shared victim cache in other implementations), assuming that the L3 cache 245 is a shared victim cache.

Accordingly, in some implementations, SDR will be enabled or otherwise performed to fetch an entry which missed L2 cache 240 from memory 215 in parallel with a lookup to L3 cache 245 if L2-RHT 255 indicates that the entry is likely to miss the L3 cache 245. SDR will be disabled or otherwise not performed, and a lookup to L3 cache 245 will take place without a parallel lookup of memory 215, if L2-RHT 255 indicates that the entry is not likely to miss the L3 cache 245.

Figure 3:
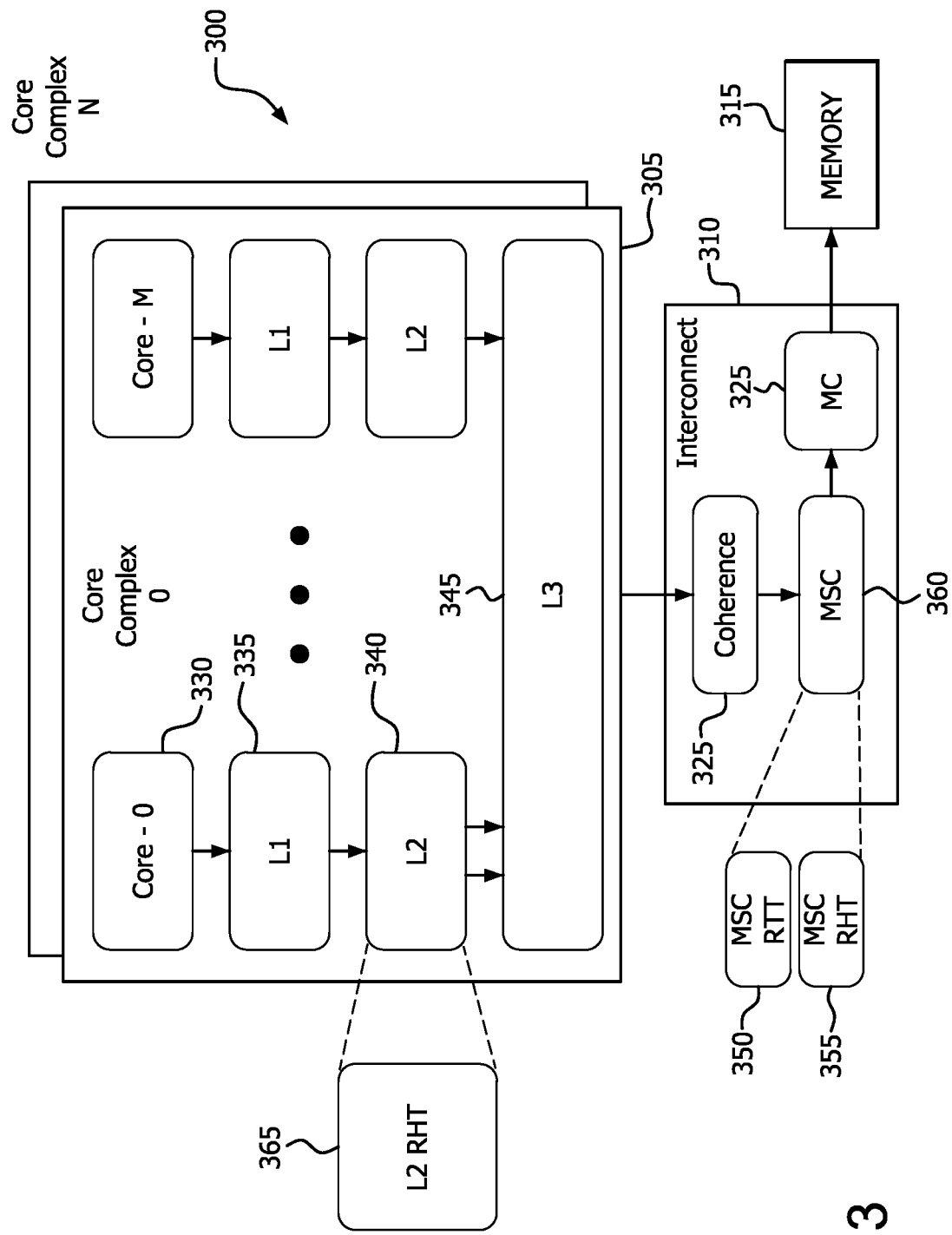
FIG. 3 is a block diagram illustrating portions of an example computing system which leverages correspondence between spatial access patterns of a private cache and memory side cache.

FIG. 3 is a block diagram illustrating portions of an example computing system 300 which leverages the correspondence between spatial access patterns of a private (L2 in this example) cache and last level (L3 in this example) cache. Computing system 300 includes core complexes (N core complexes in this example) including a core complex 305, interconnect 310, and memory 315.

Each of the N core complexes includes a plurality of cores (M cores in this example), a shared cache, and private caches for each core. For example, in core complex 305, core 330 includes or is in communication with an L1 cache 335, an L2 cache 340, and an L3 cache 345. L1 cache 335 is private to core 330 and is the top-level cache in the memory hierarchy of core 330. L2 cache 340 is also private to core 335. L3 cache 345 is shared among all of the cores (Core 0-Core M) of core complex 305 and is a victim cache of L2 cache 340, and of L2 caches of the other cores in core complex 305. It is noted that in some examples, L2 cache 340 is a victim cache, or a non-inclusive cache, with respect to L1 cache 335.

Interconnect 310 includes any suitable hardware and/or software for providing communication between core complexes 305 and memory 315. For example, in some implementations, interconnect 310 includes a memory bus and/or any other suitable communications interface. In this example, interconnect 310 includes coherence manager 320 and memory controller 325. Coherence manager 320 manages coherence among the caches of core complexes 305 and may include any suitable hardware and/or software for this purpose, such as a cache directory and/or probe filter. Memory controller 325 includes any suitable hardware and/or software for managing the flow of data going to and from memory 315. Interconnect 310 also includes an MSC 360 in this example.

Memory 315 is a main memory of computing system 300, and may include any suitable memory, such as DRAM.

MSC cache 360 also includes an MSC region training table (MSC-RTT) 350, and an MSC region history table (MSC-RHT) 355.

In operation, MSC-RTT 350 tracks hits and misses of MSC cache lookups, e.g., due to L3 cache misses at L3 cache 345. In some implementations, MSC-RTT 350 tracks hits and misses of MSC cache lookups by region. In some implementations, the region is a region of physical memory (e.g., of memory 315). In some implementations, the region is a fixed-size portion of the address space of computing system 300. In some implementations, the region includes multiple consecutive cache blocks. In some implementations, MSC-RTT 350 tracks a pattern of accesses to the region.

In some implementations, MSC-RTT 350 tracks a pattern of missed LLC cache lookups to a particular region using a bit vector associated with the region. This bit vector can be referred to as a spatial bit vector or spatial pattern. In some implementations, the region is identified by a cache tag, which can be referred to as a region tag. In some implementations, the spatial pattern is associated with a particular region by association with a particular region tag. In some implementations, MSC-RTT 350 tracks missed MSC cache lookups to a particular region within a particular time interval. The time interval can be referred to as a spatial region generation interval.

In some implementations, the pattern of MSC cache misses for memory addresses corresponding to a particular region during a spatial region generation interval are recorded in a spatial bit vector associated with a region tag corresponding to the particular region. In some implementations, the spatial bit vector represents the set of blocks in the associated region that are accessed during a spatial region generation interval, and the spatial bit vector captures the layout of cache blocks accessed near one another in time (i.e., within the spatial region generation interval). In some implementations, the spatial region generation interval is defined in any suitable manner. For example, in some implementations the spatial region generation interval is a pre-defined time duration. In some implementations, the pre-defined time duration is defined in terms of cycles. In some implementations, a spatial region generation interval is on the order of several hundred cycles, or several thousand cycles, for example. In some implementations, a region associated with a region tag is considered trained, or fully trained, after the spatial bit vector associated with the region tag has been accumulated over an entire spatial region generation interval.

After a region has been trained, or fully trained, in some implementations, the region tag and associated spatial bit vector are stored in MSC-RHT 355. After a spatial bit vector corresponding to a region is available in MSC-RHT 355, in some implementations, the spatial bit vector is predictive of whether a missed MSC cache 360 lookup of an address in the region will miss the L3 cache 345 following a missed lookup of L2 cache 340. Thus, in some implementations, entries of MSC RHT 355 are copied to L2 RHT 365 for prediction of L3 cache misses.

This is consistent with the observation that in some implementations spatial access patterns at the chip or MSC level are the same or similar to access patterns in a shared victim cache. The L2-RHT 365, based on training at the MSC-RTT 350 and imported from the MSC-RHT 355, is predictive of whether an L3 lookup will hit or miss the L3 cache (or other shared victim cache in other implementations), assuming that the L3 cache is a shared victim cache.

Accordingly, in some implementations, SDR will be enabled or otherwise performed to fetch an entry which missed L2 cache 340 from memory 315 in parallel with a lookup to L3 cache 345 if L2-RHT 365 indicates that the entry is likely to miss the L3 cache 345. SDR will be disabled or otherwise not performed, and a lookup to L3 cache 345 will take place without a parallel lookup of memory 315, if L2-RHT 365 indicates that the entry is not likely to miss the L3 cache 345.

Figure 4:
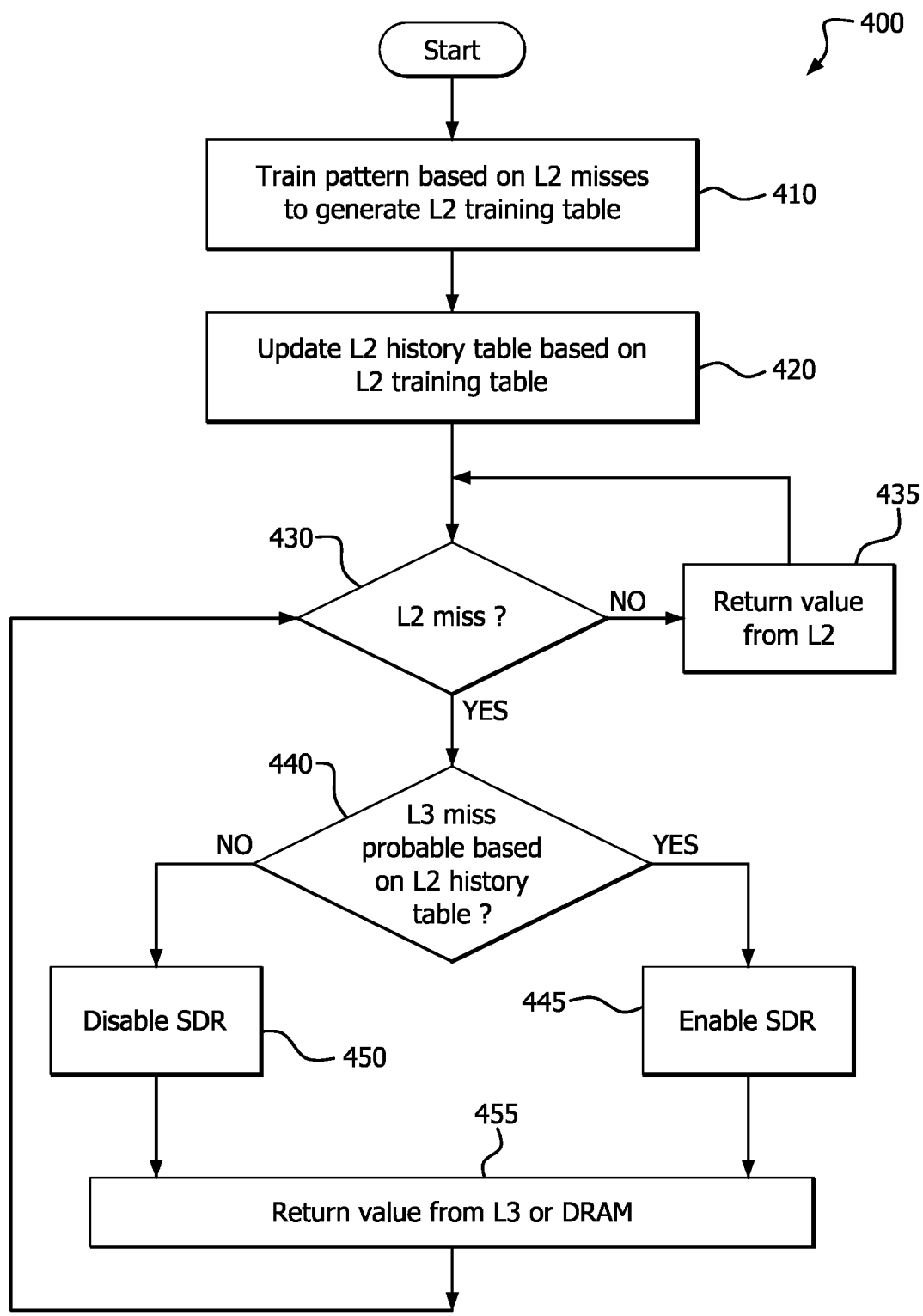
FIG. 4 is a flow chart illustrating an example method for enabling or disabling speculative DRAM request (SDR) at a shared victim cache based on the observation that spatial access patterns of a private cache are the same or similar to access patterns of the shared victim cache.

FIG. 4 is a flow chart illustrating an example method 400 for enabling or disabling SDR at a shared victim cache based on the observation that spatial access patterns of a private cache are the same or similar to access patterns of the shared victim cache. Method 400 is usable, for example, in computing system 200 shown and described with respect to FIG. 2, or in any other suitable system.

In step 410, a spatial access pattern for the private cache is trained. This may include, for example, training a region training table, such as L2-RTT 250, e.g., in a manner as shown and described with respect to FIG. 2.

In step 420, a region history table is updated based on the training of step 410. This may include, for example, updating a region history table, such as L2-RHT 255, e.g., in a manner as shown and described with respect to FIG. 2.

On condition 430 that a cache lookup hits the private cache (e.g., L2 cache 240 as shown and described with respect to FIG. 2), the corresponding value is returned from the private cache at step 435, and the flow returns to condition 430. On condition 430 that a cache lookup misses the private cache, it is determined (e.g., based on RHT 255, as shown and described with respect to FIG. 2) whether it is likely (e.g., above a threshold probability) that the cache lookup will miss a shared victim cache of the private cache (e.g., L3 cache 245).

On condition 440 that it is likely (e.g., above the threshold probability) that the cache lookup will miss the shared victim cache, SDR is enabled or otherwise used in step 445. On condition 440 that it is not likely (e.g., not above the threshold probability) that the cache lookup will miss the shared victim cache, SDR is disabled or otherwise not used in step 450.

In step 455, the value corresponding to the cache lookup that missed the private cache is returned from the shared victim cache or the memory.

Figure 5:
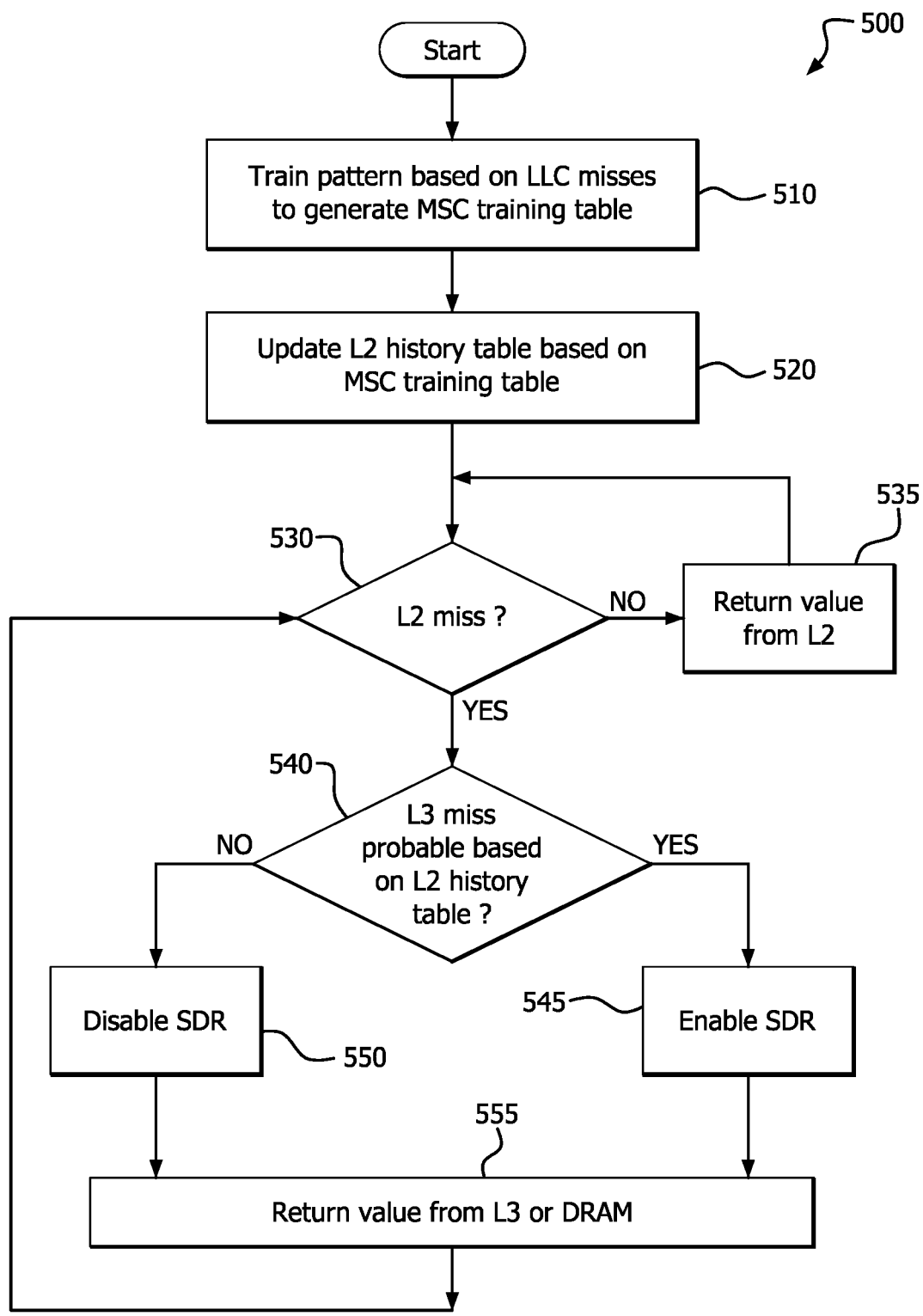
FIG. 5 is a flow chart illustrating an example method for enabling or disabling SDR at a shared victim cache based on the observation that spatial access patterns of a MSC are the same or similar to access patterns of the shared victim cache.

FIG. 5 is a flow chart illustrating an example method 500 for enabling or disabling SDR at a shared victim cache based on the observation that spatial access patterns of a MSC are the same or similar to access patterns of the shared victim cache.

Method 500 is usable, for example, in computing system 300 shown and described with respect to FIG. 3, or in any other suitable system.

In step 510, a spatial access pattern for the MSC is trained. This may include, for example, training a region training table, such as MSC-RTT 350, e.g., in a manner as shown and described with respect to FIG. 3.

In step 520, a region history table is updated based on the training of step 510. This may include, for example, updating a region history table, such as MSC-RHT 355, e.g., in a manner as shown and described with respect to FIG. 4. A further region history table is updated based on the updated region history table. This may include, for example, updating a region history table such as L2 RHT 365 based on MSC-RHT 355, e.g., in a manner as shown and described with respect to FIG. 4.

On condition 530 that a cache lookup hits the private cache (e.g., L2 cache 340 as shown and described with respect to FIG. 3), the corresponding value is returned from the private cache at step 535, and the flow returns to condition 530. On condition 530 that a cache lookup misses the private cache, it is determined (e.g., based on L2-RHT 365, as shown and described with respect to FIG. 3) whether it is likely (e.g., above a threshold probability) that the cache lookup will miss a shared victim cache of the private cache (e.g., L3 cache 345).

On condition 540 that it is likely (e.g., above the threshold probability) that the cache lookup will miss the shared victim cache, SDR is enabled or otherwise used in step 545. On condition 540 that it is not likely (e.g., not above the threshold probability) that the cache lookup will miss the shared victim cache, SDR is disabled or otherwise not used in step 550.

In step 555, the value corresponding to the cache lookup that missed the private cache is returned from the shared victim cache or the memory.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the accelerated processing device 116, the scheduler 136, the graphics processing pipeline 134, the compute units 132, the SIMD units 138) may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general-purpose computer, a processor, or a processor core. Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for retrieving information based on cache miss prediction, the method comprising:
    predicting, based on a history of cache misses at a private cache, that a cache lookup for the information will miss a shared cache;
    executing a speculative memory request based on the prediction that the cache lookup for the information will miss the shared cache; and
    fetching the information based on the speculative memory request.

2. The method of claim 1, the fetching comprises fetching the information from a main memory and from the shared cache based on the speculative memory request.

3. The method of claim 1, wherein the speculative memory request comprises a speculative DRAM request (SDR).

4. The method of claim 1, wherein the private cache is an L2 cache and the shared cache is an L3 cache.

5. The method of claim 1, wherein the prediction is based on a spatial bit vector.

6. The method of claim 1, wherein the private cache and the shared cache are within a coherence domain.

7. The method of claim 1, wherein the shared cache is a victim cache.

8. The method of claim 1, wherein the private cache is a non-inclusive cache.

9. A processor configured for retrieving information based on cache miss prediction, the processor comprising:
    circuitry configured to predict, based on a history of cache misses at a private cache, that a cache lookup for the information will miss a shared cache;
    circuitry configured to execute a speculative memory request based on the prediction that the cache lookup for the information will miss the shared cache; and
    circuitry configured to fetch the information based on the speculative memory request.

10. The processor of claim 9, further comprising circuitry configured to fetch the information from a main memory and from the shared cache based on the speculative memory request.

11. The processor of claim 9, wherein the speculative memory request comprises a speculative DRAM request (SDR).

12. The processor of claim 9, wherein the private cache is an L2 cache and the shared cache is an L3 cache.

13. The processor of claim 9, further comprising circuitry configured to store a spatial bit vector, wherein the prediction is based on the spatial bit vector.

14. The processor of claim 9, wherein the private cache and the shared cache are within a coherence domain.

15. The processor of claim 9, wherein the shared cache is a victim cache.

16. A method for retrieving information based on cache miss prediction, the method comprising:
    predicting, based on a history of cache misses at a last level cache, that a cache lookup for the information will miss a shared cache;
    enabling a speculative memory request based on the prediction that the cache lookup for the information will miss the shared cache; and
    fetching the information based on the speculative memory request.

17. The method of claim 16, the fetching comprises fetching the information from a main memory and from the shared cache based on the speculative memory request.

18. The method of claim 16, wherein the speculative memory request comprises a speculative DRAM request (SDR).

19. The method of claim 16, wherein the shared cache is within a coherence domain and the last level cache is not within a cache coherence domain.

20. The method of claim 16, wherein the last level cache comprises a memory adjacent cache.

* * * * *